United States Patent [19]

Bezzeccheri et al.

[11] Patent Number: 5,162,104

[45] Date of Patent: Nov. 10, 1992

[54] APPARATUS AND METHOD FOR INDIRECTLY HEATING A GAS

[75] Inventors: Maurizio Bezzeccheri, Pompei; Francesco Giacobbe; Lorena Mosca, both of Rome, all of Italy

[73] Assignees: Mannesmann Aktiengesellschaft, Dusseldorf, Fed. Rep. of Germany; K.T.I. Group B.V., Zoetermeer, Netherlands

[21] Appl. No.: 469,190

[22] Filed: Jan. 24, 1990

[30] Foreign Application Priority Data

Jan. 24, 1989 [IT] Italy .............................. 47570 A/89

[51] Int. Cl.⁵ ............................................ F27B 13/00
[52] U.S. Cl. .................... 422/193; 126/91 A; 122/14; 122/33; 422/197; 422/201; 422/202; 431/353
[58] Field of Search ............... 422/198, 201, 202, 193, 422/197; 431/353; 122/32-33, 18, 14, 19; 126/91 A

[56] References Cited

U.S. PATENT DOCUMENTS

| 1,894,768 | 1/1933 | Hechenbleikner | 422/201 X |
| 2,029,604 | 2/1936 | Bayer et al. | 422/197 X |
| 2,078,949 | 5/1937 | Houdry | 422/201 |
| 2,299,122 | 10/1942 | Battin | 122/14 |
| 2,408,282 | 9/1946 | Wolf | 422/202 |
| 2,594,329 | 4/1952 | Mayhew | 422/201 X |
| 4,750,986 | 6/1988 | Pinto et al. | 422/193 X |

Primary Examiner—Lynn M. Kummert
Assistant Examiner—Amalia Santiago
Attorney, Agent, or Firm—Cohen, Pontani, Lieberman & Pavane

[57] ABSTRACT

A stream of process gas is indirectly heated in an elongated reaction chamber (1) with a longitudinal axis, a first end (12) and a second end (13) and defined by an outside shell (2) and a thermally conductive inner wall (4). The inner wall defines at least one recess or cavity (3) which extends substantially between the first and second end of the chamber and parallel to the longitudinal axis thereof. A process feed line (6) and a product-gas discharge line (7) are provided at opposite ends (12, 13) of the chamber. A heat conductive and heat resistant barrier (8) which defines an interior space extends coaxially with the recess or cavity (3) substantially along the entire length of the inner wall (4) and forms an annular space (9) therewith. A hot flue gas feed line (10) and a flue gas discharge line (11) is provided at one end (13) of the chamber. The hot gas feed line (10) leads directly into the interior space of the barrier (8) and the annular space (9) is in fluid communication with the interior space of the barrier (8) at the end (12) of the chamber which is opposite to the location of the hot flue gas feed line (10).

15 Claims, 2 Drawing Sheets

APPARATUS AND METHOD FOR INDIRECTLY HEATING A GAS

FIELD OF THE INVENTION

The present invention relates to a method and apparatus for the indirect heating of a stream of process gas in a reaction chamber for an endothermic, especially catalytic, reaction and particularly to such process that is performed at substantially constant temperature.

BACKGROUND OF THE INVENTION

One possible field of use of the invention is the catalytic steam reforming of hydrocarbons for the production of a hydrogen-rich gas. As process gas a mixture of steam, hydrocarbon and/or carbon dioxide is used. This gaseous mixture is fed at temperatures of about 400°–600° C. and pressures up to 4 MPa to a reaction chamber which may consist of a plurality of catalyst-filled tubes and is heated there to about 750° to 800° C. This gaseous mixture then reacts endothermically via the catalyst to form a hydrogen-rich gas containing portions of carbon monoxide, carbon dioxide and excess steam and hydrocarbon.

The hydrogen content of the product gas produced depends, among other things, on the excess of steam used as well as on the temperature and pressure in the catalyst-filled tube. An increase in the excess of steam and in the temperature within the catalyst-filled tube result in an increase in the recovery of hydrogen, while an increase in pressure results in a decrease thereof.

From EP 0 194 067 B1, an apparatus for the carrying out of an endothermic catalytic reaction of a stream of process gas is known. The disclosed apparatus has a housing with one or more catalyst-filled tubes arranged parallel to each other therein, each having a blind end. Within the housing, means are provided for the feeding and discharge of a flue gas for heating the outer surface of the catalyst-filled tubes through the inside of which the stream of process gas is conducted, thereby absorbing heat. The catalyst-filled tubes are in each case surrounded by a tubular shell which forms an annular space with the tube. The shell extends over the greater part of the catalyst-filled tube. The feed for the flue gas is directed directly toward the blind end of the catalyst-filled tube. The direct flow effected thereby of the hot flue gas against the catalyst-filled tube proves disadvantageous since in this way the thermal load on the blind end of the catalyst-filled tube is very high. At critical points, such high temperatures are produced in the shell of the catalyst-filled tube that it becomes damaged within a relatively short period of time and must be replaced unless a suitable cooling of the flue gas has been previously provided. This could be done, for instance, by a preliminary heat exchanger or by mixing with flue gas which has already been cooled. Both of these measures require corresponding additional structural expense.

In order to mitigate the thermal load on the catalyst-filled tubes, it is known to provide them on their outside with a ceramic protective covering in the region of the direct action of the hot flue gas. One disadvantage of such protective coverings lies in their susceptibility to thermal expansion stresses, which leads to damage to the ceramic and then, merely with a time delay, also to damage to the catalyst-filled tubes themselves.

In the non-previously published Patent Application EP 89 250 073.7 of the present assignee, it is proposed, to solve the problem of overheating of the walls of a reaction chamber, to conduct the hot flue gas used for the heating of the walls of the reaction chamber, first of all, along a barrier consisting of a temperature-resistant material which is a good conductor of heat, thereby allowing it to give heat off to said barrier until it has reached a temperature which is harmless for the walls of the reaction chamber. Only then is the stream of flue gas deflected and conducted further in the opposite direction on the other side of the barrier, the flue gas which has already cooled down somewhat coming into direct contact with the walls of the reaction chamber and giving heat off to these walls. Since the flue gas, however, at the same time, takes up heat from the heated barrier, its temperature is maintained practically constant despite the heat given off to the reaction chamber in the region of the barrier, which extends only over a part of the length of the reaction chamber. Outside the region of the barrier the flue gas cools relatively rapidly down on its path along the reaction chamber so that the temperature within the reaction chamber shows a correspondent gradient.

While in EP 89 250 073.7, only thermal damage to the walls of the reaction chamber is to be avoided, the object of the present invention is to optimize the thermal conditions for an endothermic reaction, particularly a catalytic reaction, so that substantially isothermal conditions prevail within the entire reaction chamber.

This means that the reaction chamber will no longer, as previously customary, have a strong temperature gradient with which the desired endothermic reaction takes place with correspondingly strongly different intensity in the different regions, but that a better utilization of the reaction chamber is obtained, in the manner that approximately equally good reaction conditions from a thermal standpoint are created practically everywhere.

SUMMARY OF THE INVENTION

This object is achieved by a method of indirectly heating a stream of process gas in a reaction chamber for an endothermic and particularly catalytic reaction comprising passing a stream of process gas into the reactor chamber having a longitudinal axis and a heat receiving wall with an axial length; providing a heat-conductive, heat resistant barrier spaced from and opposite substantially the entire length of the heat receiving wall of the reaction chamber, the barrier having a first surface and opposite thereto a second surface facing the heat receiving wall of the reaction chamber; causing a heated gas to flow at a velocity along the first surface of the barrier in a first direction thereby giving off heat to the barrier; passing the hot gas at a velocity between the second surface of the barrier and the heat receiving wall in opposite directions, preferably after the flue gas has reached a predetermined temperature which will not be detrimental to the walls of the reaction chamber; and adjusting the velocities of flow of the streams of hot gas in the first and the second direction so that the heat receiving wall of the reaction chamber exhibits substantially the same temperature over the axial length thereof. Advantageously, the method is further improved by passing the stream of process gas in the opposite direction to the stream of hot gas passing along the heat receiving wall of the reaction chamber.

The apparatus for carrying out the method comprises an elongated reaction chamber having a longitudinal axis, a first end, a second end and being defined by an outside shell and a thermally conductive inner wall, the inner wall defining at least one recess or cavity extending substantially between the first and second end of the chamber and parallel to the longitudinal axis thereof; a process feed line and a product-gas discharge line at opposite ends of the chamber; a heat conductive and heat resistant barrier defining an interior space and extending coaxially with the recess substantially along the entire length of the inner wall and forming an annular space therewith; a hot gas feed line and a gas discharge line at one end of the chamber, the hot gas feed line leading directly into the interior space of the barrier; and the annular space being in fluid communication with the interior space of the barrier at the end of the chamber which is opposite to the location of the hot gas feed line. Preferably, the product gas feed line is arranged at the same end of the reactor at which the flue gas feed line and the discharge lines are located. The reactor may additionally comprise a flow-displacement body for the hot gas which is arranged coaxially within the barrier or tubular body, as is further described below. The feed line for the hot gas is further advantageously developed as a combustion chamber with refractory walls. Preferably, there is provided a connecting pipe between the gas discharge line and the combustion chamber for permitting a partial stream of the gas to be returned into the combustion chamber. Preferably, a heat insulation jacket is provided surrounding the reaction chamber and the gas feed line and the gas discharge line are arranged at the bottom of a vertical reactor. Finally, the reaction chamber has a dome shaped wall in the area between the interior space of the barrier and the annular space between the barrier and the inner wall of the reaction chamber. Further characteristic features representing advantageous developments of the apparatus of the invention include that the product-gas feed line is arranged at the end of the reaction chamber at which the flue gas feed line and the discharge lines are located. A flow-displacement body for the hot gas can be arranged coaxially within the heat conductive and heat resistant barrier. Preferably, the feed line for the hot gas is formed as a combustion chamber having refractory walls. A line connection may be placed between the discharge line of the gas and the combustion chamber for permitting a partial stream of the gas to be returned into the combustion chamber. Additional heat insulation surrounding the reaction chamber may be provided. Preferably, the reaction chamber is an upright chamber with a vertical axis. The first end of the apparatus may form the bottom of the chamber and the gas feed line and the gas discharge line are arranged at said bottom. The inner wall of the reaction chamber may include a dome-shaped wall in the region of the open connecting point between the annular space and the interior space of the barrier.

The invention utilizes the teaching of EP 89 250 073.7 and considerably expands the area of application thereof by providing that the indirect heat exchange between the sections of flow of one and the same stream of flue gas which is conducted in opposite directions on opposite sides of a heat-conducting barrier is maintained over the entire axial length of the reaction chamber. This way, the heat given off within the section of flow of the flue gas which faces the walls of the reaction chamber can be compensated for in part by the absorption of heat which takes place from the oppositely directed section of flow of the flue gas through the heat-conducting barrier. The temperature of the flue gas which is passed in direct contact along the walls of the reaction chamber therefore, despite the continuous removal of heat to the reaction chamber which takes place by convection, decreases comparatively slowly.

On the other hand, heat exchange takes place between the barrier and the walls of the reaction chamber as a result of heat radiation. The intensity of this heat radiation over the axial length of the reaction chamber tends to vary conversely to the temperature of the flue gas in the section of flow which faces the walls of the reaction chamber. Consequently, the walls of the reaction chamber, through which the heat exchange takes place, heat up approximately to the same temperature and despite the endothermic reaction processes which take place an approximately equal temperature is formed everywhere within the reaction chamber, which temperature can be adjusted to an optimal value (as a function of the type of reaction).

One prerequisite for this is that the stream of process gas introduced into the reaction chamber has already been pre-heated to reaction temperature. Otherwise, there is, of course, a zone of lower temperature within the reaction chamber, within which the heating to reaction temperature takes place. The pre-heating of the process gas can be effected by utilizing the heat which is still contained in the discharged cooled flue gas.

The invention enables optimal use of a reaction chamber of given size by maintaining the temperature at a constant maximal level approximately, in the entire chamber. This maximum value is selected so that the permissible thermal stresses of the materials used for the reactor are not exceeded and, at the same time, the most favorable thermal conditions are present for the specific chemical reaction.

BRIEF DESCRIPTION OF THE DRAWINGS

The invention will be described below in greater detail with reference to embodiments shown in FIGS. 1 and 2 of the accompanying drawings, in which.

DETAILED DESCRIPTION OF THE PRESENTLY PREFERRED EMBODIMENTS

Figure 1:
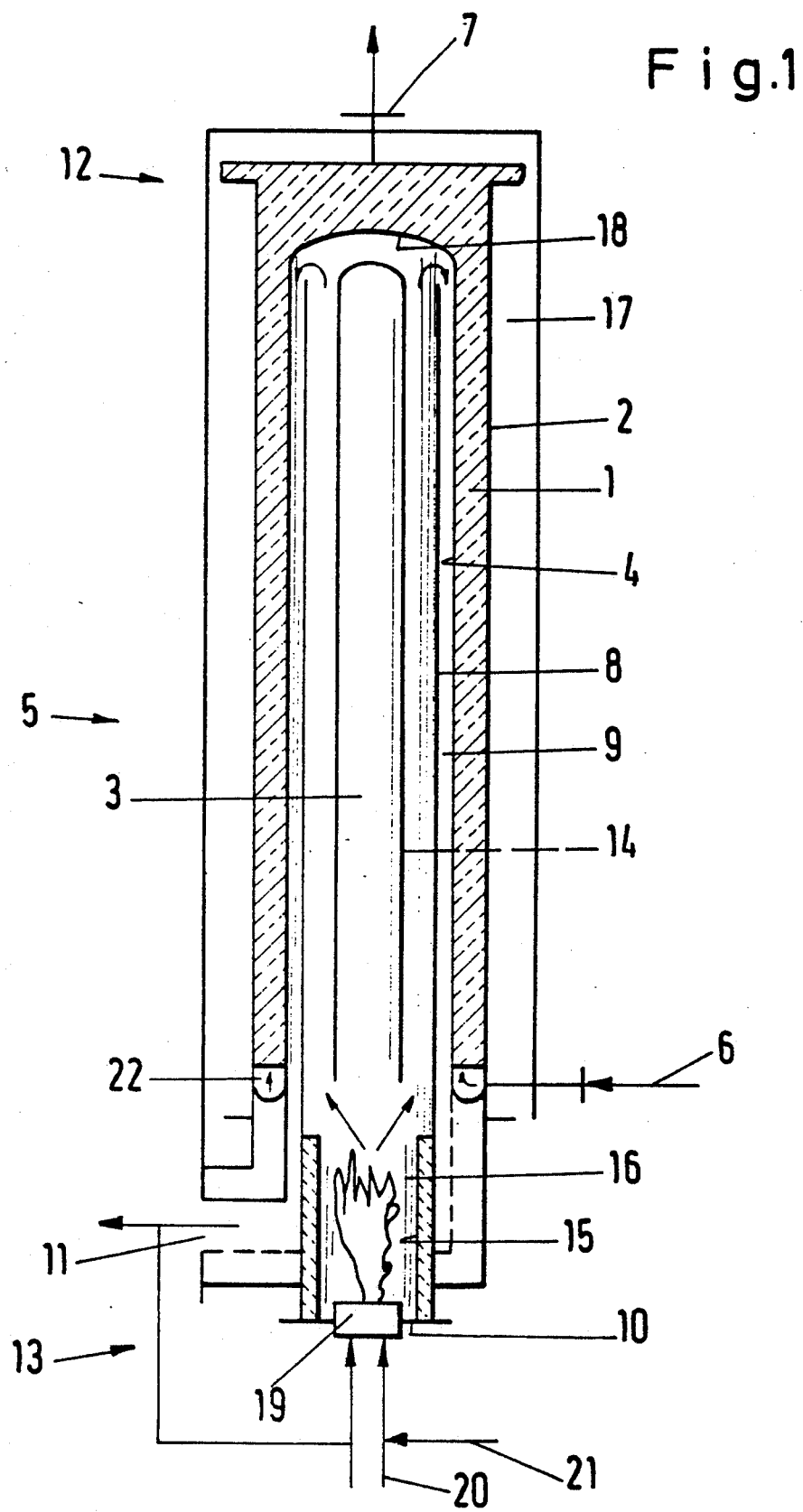
FIG. 1 is a cross-sectional view of a reactor in accordance with the present invention having a cylindrical recess in the reactor chamber.

The reactor 5 shown in FIG. 1 has a reaction chamber 1 with an outer cylindrical shell 2. The reaction chamber 1 is preferably of substantially annular shape since it has a preferably cylindrical recess or cavity 3 therein, defined by an inner wall 4 made of material of good heat conductivity.

In the reactor 5, which is preferably of vertical construction, a pre-heated process gas (for instance, ethyl benzene vapors) is introduced at the bottom via feed line 6. This process gas flows, first, into an annular distributor space 22 and, from there, upwards into the actual reaction chamber 1, which is filled, for instance with a catalyst 30. After flowing through the mass of catalyst, the process gas is converted into a product gas (for instance, styrene) and emerges from the reaction chamber 1 at the other or second end 12 of the reactor 5 through the product gas outlet 7. In order to maintain the endothermic reaction in reaction chamber 1, the reaction chamber must be heated by a hot flue gas. For this purpose, a flue gas feed line 10 is provided at the lower or first end 13 of the reactor 5, through which line hot flue gases are conducted directly into the cylindrical recess or cavity 3. The flue-gas line 10 is advantageously developed as combustion chamber 16 with refractory walls 15 so that the production of the flue gas can take place directly in the reactor 5.

For this purpose the combustion chamber 16 is provided at its lower end with a burner 19 to which fuel and an oxygen-containing gas can be fed through the lines 20 and 21. The burner or the means for generating said hot gas, is connected to said interior space at the end of the chamber bearing the process gas feed line for admitting the hot gas into the interior space thereof. Within the recess 3 directly adjoining the flue-gas line 10, there is a barrier which is developed as tubular body 8 of good-heat conductive material. This gas-tight tubular body 8, which extends up to close to the upper end of the cylindrical cavity 3, screens the inner wall 4 of the reaction chamber 1 from direct contact with the hot flue gas and forms an annular space 9 with the wall 4. This annular space 9 is open at the top toward the inside of the cylindrical cavity 3. The hot flue gas produced by the burner 19 therefore, first, flows upward along the tubular body 8, is then deflected outward at the upper end of the tubular body and finally flows in the opposite direction over the outside of the tubular body 8 downward through the annular space 9, where it is discharged through the flue-gas discharge line 11 at the lower end 13 of the reactor 5.

The flue gas flowing downward through the annular space 9 continuously gives off heat via the wall 4 to the process gas flowing in the opposite direction through the reaction chamber 1 thus enabling the endothermic reaction there. Since, at the same time, hot flue gas flows along the inside of the tubular body 8 and gives off heat to the tubular body 8, part of this heat is transferred to the downward flowing section of flow of the stream of flue gas so that its temperature decreases comparatively slowly despite the continuous discharge of heat to the process gas.

The extent of the heat exchange between the two flow sections of the stream of flue gas, as well as between the downward-flowing stream of flue gas and the stream of process gas, can be influenced by the selection of the diameter of the tubular body since a larger diameter, other conditions being the same, results in a reduction in the annular space 9 and thus an increase in the velocity of flow in the downward-directed section of flow of the flue gas so that the flue gas, due to the intensified exchange of heat (convection) with the inner wall 4 of the reaction chamber 1, enters the flue-gas discharge line 11 at a lower temperature. The heat exchange between the two oppositely directed sections of flow of the flue gas can be controlled particularly effectively in the manner that, within the cylindrical recess 3, in the region of its longitudinal axis, there is arranged a flow-displacement body 14 which extends approximately over the length of the tubular body 8 and maintains the upward-directed section of flow of the stream of flue gas near the inner surface of the tubular body 8. The velocity of flow of the upward-directed stream of flue gas increases corresponding to the reduction in cross-section, so that an improved exchange of heat by convection is produced thereby.

The flue gas flowing out of the combustion chamber 16 upward along the tubular body 8 leads to strong heating of the wall of the tubular body 8, its temperature decreasing with increase in height. Therefore, the heat radiation from the wall of the tubular body 8 onto the wall 4 of the reaction chamber 1 is considerably greater in the lower part than in the upper part thereof. This leads to a substantial equalizing of the temperature in the wall 4 over the length of the reaction chamber 1 so that substantially isothermal conditions are established also within the reactor chamber 1.

To facilitate the deflection of the stream of flue gas at the upper end of the tubular body 8, the inner side of the top of the reaction chamber 1 is developed as an approximately dome-shaped bottom 18. Due to the continuous discharge of heat within the region of the upward-directed stream of flue gas, its temperature, until reaching the upper end of the tubular body 8 and thus the dome-shaped bottom 18, can be specifically lowered to at least such an extent that the direct contact of the flue gas with the mechanically stressed inner wall 4 of the reaction chamber 1 no longer leads to thermal damage thereof.

To improve the thermal efficiency, the outside of the reactor 5 can be provided with a heat insulation 17 which reduces the radiation losses. In addition, it is advisable, in certain cases in which the burner produces a flue gas of a very high temperature, to return part of the flue gas which is discharged through the flue-gas discharge line 11 to the burner 19 or the combustion chamber 16 in order to reduce the flue-gas temperature there. Although the heat exchange between the flue gas and the process gas is preferably effected in counter-flow, particularly if the process gas has not been preheated to reaction temperature, the process of the present invention can nevertheless also be performed in accordance with the parallel-flow principle. The housing is advantageously formed of refractory material in the lower part 13 of the reactor 5, as is the flow-displacement body 14, which can be developed as solid bar or as a tube with at least one end closed. Metallic materials are recommended for the shell 2, the walls 4 and the tubular body 8.

Figure 2:
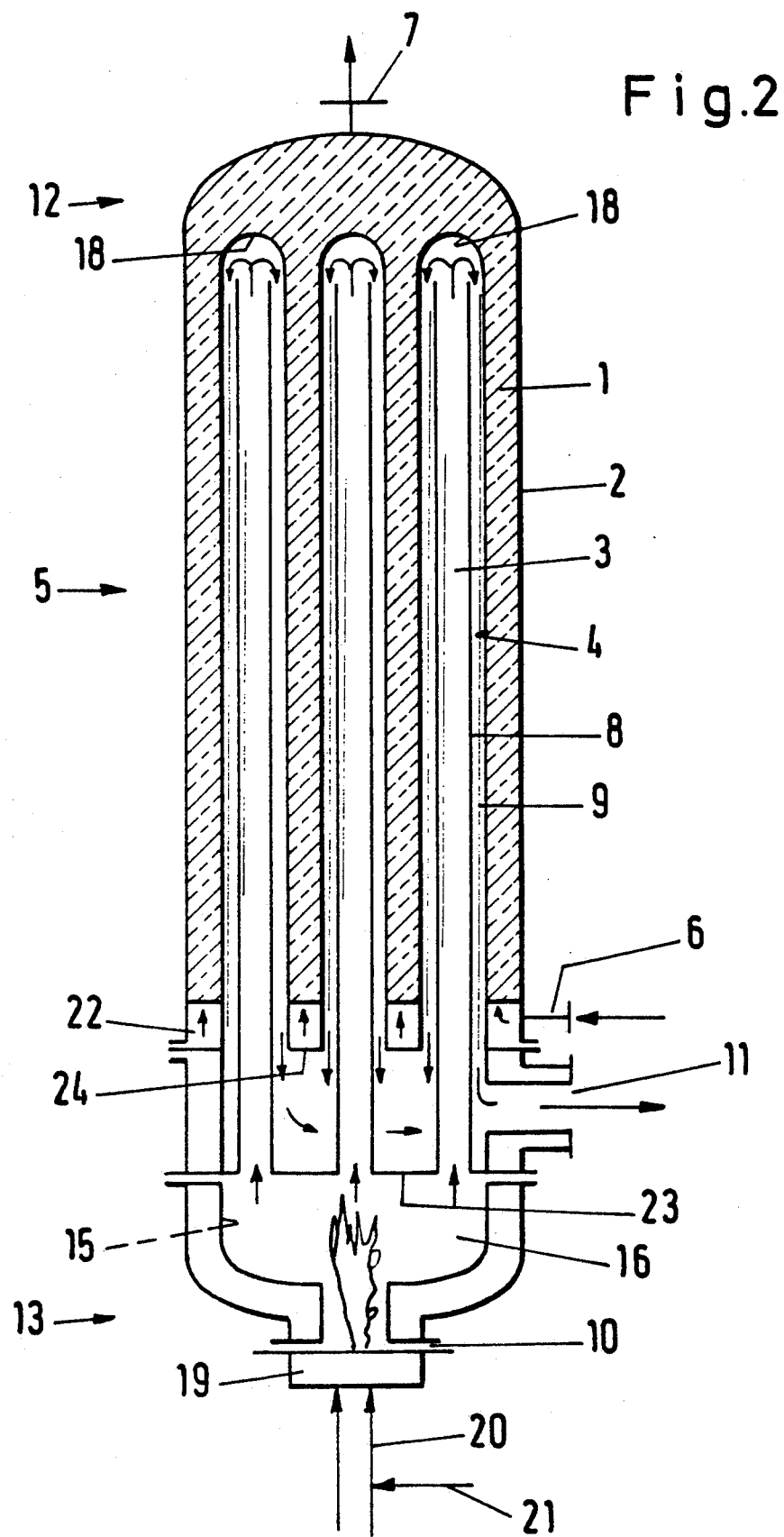
FIG. 2 is a cross-sectional view of a reactor of the present invention having a plurality of cylindrical recesses in the reactor chamber.

FIG. 2 shows a modified embodiment of the invention in which the same functional parts have been provided with the same reference numbers as in FIG. 1.

The reactor 5 shown in FIG. 2 has several cylindrical recesses 3 which are arranged parallel to each other and the cylindrical walls or bodies 8 of which are, in each case, connected in gas-tight manner with the holes of a perforated bottom 24. Each of the tubular bodies 8 which are introduced into the recesses or cavities 3 axially from below is connected in gas-tight manner with the holes of a second perforated bottom 23 which closes off the combustion chamber 16 on the top so that the hot flue gases rising upwardly through tubular body 8, are in each case deflected on the upper ends thereof within the region of the dome-shaped bottom 18, and are guided downward through the respective annular slot 9. The heat exchange between the flue-gas flow sections and the process gas takes place in the same manner as described in connection with FIG. 1. After flowing through the annular slot 9, the cooled flue gas accumulates in the space between the two perforated bottoms 23 and 24 and then emerges through the flue-gas discharge line 11 at the bottom of the housing of the reactor 5.

The invention results, in particular, in the following advantages: The reactor is of extremely simple construction and therefore results in a comparatively low expense for manufacture. The heat flow through the wall of the reaction chamber is uniform and can be approximated to an optimal maximum value which fully takes into account the thermal resistance of the materials used. Problems resulting from the direct action of an open flame or excessively hot flue gases on mechanically-stressed parts are avoided. Since the endothermic reaction can take place practically under isothermal conditions, a high volumetric efficiency of the reaction chamber is assured. Due to the comparatively compact manner of construction for a given output the radiation losses can be minimized. For the outer heat insulation, no refractory materials are required; they are recommended merely in the region of the flue-gas feed and discharge lines.

It should be understood that the preferred embodiments and examples described are for illustrative purposes only and are not to be construed as limiting the scope of the present invention which is properly delineated only in the appended claims.

We claim:

1. An apparatus for indirectly heating a stream of process gas in an endothermic, and substantially isothermic catalytic reaction, comprising:

and elongated reaction chamber (1) having a longitudinal axis, a first end (13) and a second opposite end (12) and being defined between an outside shell (2) and a thermally conductive inner wall (4) interior of said outside shell, said inner wall (4) defining at least one cavity (3) extending substantially between said first and said second end of said chamber and parallel to said longitudinal axis thereof;

a catalytic mass being disposed between and in contact with said outside shell (2) and said inner wall (4);

a process-gas feed line (6) into said chamber at said first end (13) and a product-gas discharge line (7) out of said chamber at said second end (12) of the chamber;

a heat conductive and head resistant barrier (8) defining an interior space therewithin and inside said cavity and extending coaxially with said cavity (3) substantially along the entire length of said inner wall (4) and forming an annular space (9) therewith;

a gas feed line (1) and gas discharge line (11) at said first end (13) of said chamber; said gas feed line (10) leading directly into said interior space of said barrier (8) and said gas discharge line leading out of said annular space;

said annular space (9) being in fluid communication with said interior space of said barrier (8) at said second end (12) of said chamber opposite to the location of said gas feed line (10); and means for generating a flue gas, said means being connected to said first end of said chamber bearing said process gas feed line and for admitting said flue gas into said interior space.

2. The apparatus according to claim 1, wherein said product-gas feed line (6) is arranged at said first end (13) of said reaction chamber at which said gas feed line and said gas discharge line (10,11) are located.

3. The apparatus according to claim 1, additionally comprising a flow-displacement body (14) for said hot gas arranged coaxially within said barrier (8).

4. The apparatus according to claim 1, wherein said feed line (10) for said gas defines a combustion chamber (16) having refractory walls (15) and including said flue gas generating means.

5. The apparatus according to claim 4, additionally comprising a line connection between said discharge line (11) of said gas and said combustion chamber (16) for permitting a partial stream of said gas to be returned into said combustion chamber (16).

6. The apparatus according to claim 1, additionally comprising a heat insulation (17) surrounding said reaction chamber (1).

7. The apparatus according to claim 1, wherein said reaction chamber has a vertical axis and wherein said first end (13) forms the bottom of said reaction chamber and said gas feed line (10) and said gas discharge line (11) are arranged at said bottom.

8. The apparatus according to claim 1, wherein said inner wall 4 of said reaction chamber (1) has a dome-shaped wall (18) in the region where said annular space (9) and said interior space of said barrier are in fluid communication at said second end.

9. The apparatus according to claim 2, additionally comprising a flow-displacement body (14) for said hot gas arranged coaxially within said barrier (8).

10. The apparatus according to claim 2, wherein said feed line (1) for said gas defines a combustion chamber (16) having refractory walls (15) and including said flue gas generating means.

11. The apparatus according to claim 3, wherein said feed line (10) for said gas defines a combustion chamber (16) having refractory walls (15) and including said flue gas generating means.

12. The apparatus according to claim 1, wherein said barrier is formed as a tubular body.

13. The apparatus according to claim 1, wherein said inner wall (4) defines a plurality of cavities (3).

14. The apparatus according to claim 3, wherein said flow displacement body is an elongated tubular body having a closed end.

15. The apparatus according to claim 3 wherein said flow-displacement body is an elongated tubular member and is coaxially arranged within said at least one cavity and has a closed end facing said second end of said reaction chamber and an open end facing said hot gas feed line.

* * * * *